United States Patent
Teboulle et al.

(10) Patent No.: US 12,267,861 B2
(45) Date of Patent: Apr. 1, 2025

(54) PUSH-MODE TRANSMISSION METHOD, ASSOCIATED RECORDING DEVICE AND MEDIUM

(71) Applicant: SAGEMCOM ENERGY & TELECOM SAS, Bois-Colombes (FR)

(72) Inventors: Henri Teboulle, Bois-Colombes (FR); Ziv Roter, Bois-Colombes (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 0 days.

(21) Appl. No.: 18/757,467

(22) Filed: Jun. 27, 2024

(65) Prior Publication Data

US 2025/0008546 A1    Jan. 2, 2025

(30) Foreign Application Priority Data

Jun. 28, 2023 (FR) ..................... 2306791

(51) Int. Cl.
*H04W 72/543* (2023.01)
*H04B 17/382* (2015.01)
*H04W 72/542* (2023.01)

(52) U.S. Cl.
CPC ........ *H04W 72/543* (2023.01); *H04B 17/382* (2015.01); *H04W 72/542* (2023.01)

(58) Field of Classification Search
CPC ......... H04W 28/0236; H04W 52/0245; H04W 72/543; H04W 72/542; H04B 17/382
See application file for complete search history.

(56) References Cited

U.S. PATENT DOCUMENTS

| 8,843,169 B2 | 9/2014 | Navda et al. |
| 2015/0327175 A1* | 11/2015 | Klein ................. H04L 12/2801 370/311 |
| 2018/0146040 A1 | 5/2018 | Pasqauli et al. |

FOREIGN PATENT DOCUMENTS

| EP | 3866400 A1 | 8/2021 |
| WO | 2018/161207 A1 | 9/2018 |

OTHER PUBLICATIONS

Foreign Communication from a Related Counterpart Application, French INPI Search Report and Written Opinion dated Jan. 30, 2024, French Application No. 2306791 filed on Jun. 28, 2023.

(Continued)

*Primary Examiner* — Quoc Thai N Vu
(74) *Attorney, Agent, or Firm* — Conley Rose, P.C.

(57) ABSTRACT

A method is disclosed for transmitting data in push mode by a transmitter device (100), comprising:
(a) obtaining a value of an indicator (S) of the quality of the transmission conditions;
(b) if the value indicates a quality of the transmission conditions greater than a quality threshold (S_Q, S_H), transmitting a frame,
(c) and otherwise, if a remaining time period (T) for carrying out the transmission of the data is less than a time threshold (S_T, S_T1, S_T2); transmitting the data,
(d) and if the remaining time duration (T) is greater than the time threshold (S_T, S_T1, S_T2), implementing a timeout before a repetition of steps (a) to (c).

The invention also relates to an implementation device and a storage medium.

15 Claims, 3 Drawing Sheets

(56) References Cited

OTHER PUBLICATIONS

Foreign Communication from a Related Counterpart Application, European Search Report dated Oct. 9, 2024, European Application No. 24184434.

Technical Report, Comprehensive Semantic Model for Energy Management, DLMS UA 1000-1, version 15, part 2, version 1.0 dated Dec. 21, 2021.

* cited by examiner

PUSH-MODE TRANSMISSION METHOD, ASSOCIATED RECORDING DEVICE AND MEDIUM

CROSS-REFERENCE TO RELATED APPLICATIONS

The present application claims priority to France Application No. 2306791 filed with the Intellectual Property Office of France on Jun. 28, 2023 and entitled "PUSH-MODE TRANSMISSION METHOD, ASSOCIATED RECORDING DEVICE AND MEDIUM," which is incorporated herein by reference in its entirety for all purposes.

TECHNICAL FIELD

The invention relates to a method for transmitting data in push mode, a device for implementing the method and an associated recording medium that can be used, in a non-limiting manner, in the context of a transmission of data collected repeatedly.

TECHNICAL BACKGROUND

In numerous applications, devices accumulate data periodically or non-periodically, requiring a collection, by a receiving client device, of data accumulated by a producing server device. This is for example the case of meters of diverse natures, such as electricity, gas, water or thermal energy meters. The quantity of data produced by such a device during a given time interval is not always predictable. A device can generate periodic data, for example a value measured repeatedly by the meter over a given period. The data accumulate while waiting for their transmission to the collector client device.

The communication between the server and the client can be done on a network whose transmission conditions can vary. Meters, such as electricity meters, can for example be equipped with a 2G to 5G type cellular network interface, subject to interference and whose load can vary. Carrying out a transmission under unfavorable conditions may have harmful consequences; where applicable, the frames sent may not be received correctly and it may be necessary to make one or more attempts to resend certain frames. This contributes not only to a possible saturation of the network, but also to an overconsumption of data by the server device. However, depending on the type of network and more particularly in the case of cellular networks, the server can be subjected to a limit of data to be transmitted, for example relative to a particular subscription agreement.

There is a need for an effective transmission method taking these aspects into account.

SUMMARY

One or more embodiments relate to a method for data transmission in push mode to a receiver device, implemented by a transmitter device in a communication network, the transmitter device comprising a memory comprising software code and a processor which, when executing the software code, causes the transmitter device to implement the method, the method comprising:
(a) obtaining a value of an indicator representative of the quality of the transmission conditions between the transmitter device and the receiver device in the communication network;
(b) if the value indicates a quality of the transmission conditions greater than a first quality threshold, transmitting a frame comprising the data to be transmitted to the receiver device,
(c) and otherwise, if a remaining time period for carrying out the data transmission is less than a time threshold, transmitting the data to the receiver device,
(d) and if the remaining time duration is greater than the time threshold, implementing a timeout before repeating steps (a) to (c).

Thus, the transmitter device is able to wait for an improvement in the transmission conditions if it is judged that they are not sufficiently good at a given moment. However, it is taken into account that the transmission must be carried out within a given time interval and the possibility of waiting for better conditions is subject to an evaluation of the remaining time to carry out the transmission. The number of transmission failures is thus reduced on average.

According to one or more embodiments, the quality indicator is a signal level received from the receiver device. This type of indicator can be easily obtained by the transmitter device for different types of communication networks, in particular cellular, which make the measurement tools available.

According to one or more embodiments, the time threshold is a function of the value of the quality indicator, the time threshold increasing with increasing quality.

Thus, it is possible to take into account the increasing urgency to have to transmit as the end of a transmission interval approaches.

According to one or more embodiments, a transmission following the determination that the remaining time period for carrying out the transmission of the data is less than a time threshold is carried out according to a transmission mode whose robustness depends on the value of the indicator, the robustness level being increased when the quality of the transmission conditions drops.

Thus, the chances of success of the transmission of the data are increased when the quality of the transmission conditions is not above a desired threshold.

According to one or more embodiments, the method comprises the distribution of the data to be transmitted over a number of frames which increases with the robustness level.

The increase in robustness can be done at the expense of the quantity of data transmitted, but gradually.

According to one or more embodiments, the duration of the delay time is fixed and chosen sufficiently long to allow possible change in the transmission conditions.

The choice of the delay time may depend on the nature of the network and on the speed of the changes in the typical transmission conditions for this network.

According to one or more embodiments, the method comprises, prior to the implementation of steps (a) to (d), determining the quality thresholds as a function of values of the quality indicator obtained by the transmitter device in the past.

Thus, the quality thresholds are specific to each transmitter device, which in particular is useful when the transmitter device is fixed and placed at a location where the communication conditions with a client device are not the theoretical optimal conditions.

One or more embodiments relate to a computer program product which, when the program is executed by a processor of a device, causes this device to implement at least one of the described methods.

One or more embodiments relate to a storage medium readable by a device provided with a processor, said medium comprising instructions which, when the program is executed by a processor of a device, cause the device to implement at least one of the described methods.

One or more embodiments relate to a communication device comprising means adapted to the implementation of at least one of the methods described.

BRIEF DESCRIPTION OF THE FIGURES

Further features and advantages will become apparent from the following detailed description, which may be understood with reference to the attached drawings in which.

DETAILED DESCRIPTION

In the following description, identical, similar or analogous elements will be referred to by the same reference numbers.

The block diagrams, flowcharts and message sequence diagrams in the figures illustrate the architecture, functionalities and operation of systems, devices, methods and computer program products according to one or more exemplary embodiments. Each block of a block diagram or each step of a flowchart may represent a module or a portion of software code comprising instructions for implementing one or more functions. According to certain implementations, the order of the blocks or the steps may be changed, or else the corresponding functions may be implemented in parallel. The method blocks or steps may be implemented using circuits, software or a combination of circuits and software, in a centralized or distributed manner, for all or part of the blocks or steps. The described systems, devices, processes and methods may be modified or subjected to additions and/or deletions while remaining within the scope of the present disclosure. For example, the components of a device or system may be integrated or separated. Likewise, the features disclosed may be implemented using more or fewer components or steps, or even with other components or by means of other steps. Any suitable data-processing system can be used for the implementation. An appropriate data-processing system or device comprises for example a combination of software code and circuits, such as a processor, controller or other circuit suitable for executing the software code. When the software code is executed, the processor or controller prompts the system or device to implement all or part of the functionalities of the blocks and/or steps of the processes or methods according to the exemplary embodiments. The software code can be stored in a memory or a readable medium accessible directly or via another module by the processor or controller.

Figure 1:
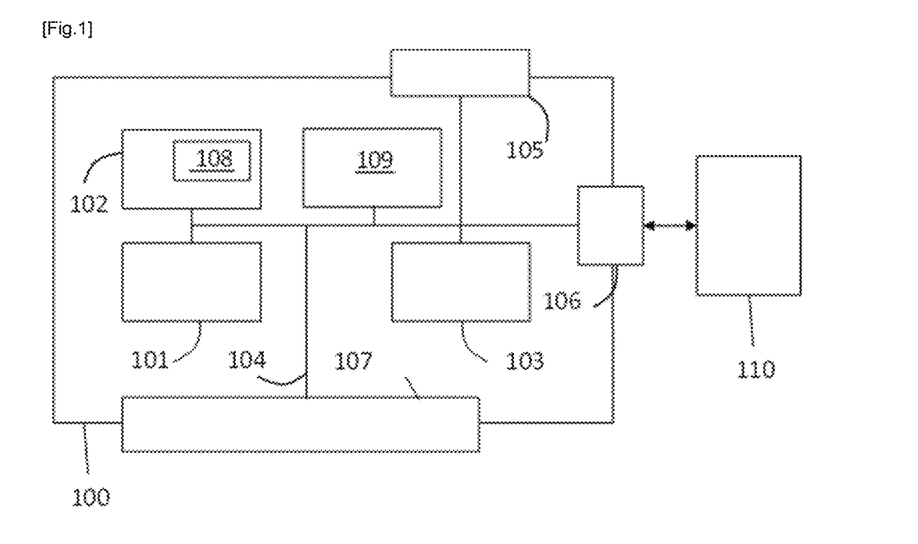
FIG. 1 is a block diagram of a system comprising a server device and a client device according to one or more embodiments.

FIG. 1 is a block diagram of a communication network comprising a device 100 and a device 110 able to communicate through the network in a bidirectional manner. The device 100 is a device that stores accumulated data or itself accumulates data, at least some of which are to be transmitted to the device 110. Hereafter, the device 100 will be called the "server" and the device 110 will be called the "client". The server 100 comprises a processor 101, a memory 102, a data source 103, a user interface 105, a communication interface 106 configured to communicate bi-directionally with the client 110, a display 107 suitable for displaying data to a user of the server 100, as well as a working memory 109. The various components of the server 100 are connected through a communication bus 104. The memory 102 comprises software code 108. The memory 109 is used to store and manage the data to be transmitted. When the processor executes the software code 108, it causes the server to implement a method according to one or more exemplary embodiments. Data to be transmitted come for example from the data source 103.

For example, the server 100 is a metrological meter of a physical quantity (typically a measurement of electricity, water, gas, thermal energy, etc), while the client 110 is a device collecting data from different servers on behalf of the operator of the distribution network. The data source 103 is for example the metrological unit per se, of the meter, the unit that produces a value of the quantity being metered. The metrological unit is for example responsible for measuring and recording an absolute physical quantity (intensity of a current, gas pressure) or a cumulative one (electrical energy or volume of a gas that has passed through). The data can be obtained periodically or aperiodically or comprise a combination of data obtained periodically and aperiodically. The communication network is for example a radio medium of one of the types 2G/3G/4G/LTE NB-IoT/LTE Cat-M1/LoRA or other types.

DLMS, or "Device Language Message Specification", comprises a series of standards developed and held by the DLMS User Association ("DLMS UA") standardizing data exchanges for electricity meters or other meters. The DLMS UA in particular maintains the COSEM (Comprehensive Semantic Model for Energy Management) "Blue Book". In particular, the document "DLMS UA 1000-1", version 15, part 2, version 1.0 dated 21 Dec. 2021 describes elements used in pushing data from a server to a client. The document introduces a mechanism that makes it possible, upon each periodic triggering of the push transmission, to select a certain quantity of recorded data to be transmitted.

The server 100 and the client 110 of FIG. 1 can, by way of non-limiting example, be compatible with the DLMS standard, but the reference to this standard is essentially made to illustrate a concrete embodiment more clearly, without this limiting the generality of the disclosure. A person skilled in the art will be able to adapt the teachings of the present description to contexts other than DLMS.

According to one or more embodiments, a transmission is carried out on the initiative of the server device. According to the envisaged implementation, various mechanisms can be implemented to allow the server device to initiate a transmission. For example, a push transmission mode initiated by the server can be implemented. According to certain embodiments, the server may also request the client to transmit a request to it in response to which the server can perform a data transmission—this is referred to as a request triggered by a frame in push mode (push triggered by pull).

As an example, in the context of DLMS, A transmission in push mode is subject to one or more limitations, including:

(a) Periodic scheduling of the transmission with a time interval whose start and length are required to carry out the transmission.

(b) A random timeout at the beginning of the transmission period.

(c) In the event of an unsuccessful transmission, a period between two tests that are fixed or of increasing duration.

In the context of DLMS, a server itself independently determines a random time to communicate. There is no coordination between the server or servers and the client in order to avoid the overlap of communications—there is confidence in statistical chance.

According to one or more exemplary embodiments, an evaluation of the transmission conditions is carried out before transmission. If the conditions are estimated sufficiently good (e.g., a quality indicator is located beyond a threshold), the transmission is carried out. However, if the conditions are judged to be insufficient, the server will initially wait for an improvement in these conditions. For example, the server initiates a timeout before performing a new evaluation of the transmission conditions. One or more timeout loops can be carried out. By way of example, the quality of the signal received from the client by the server is estimated.

Thus, the decision of the server to transmit takes into account the network conditions.

According to one or more exemplary embodiments, several thresholds are implemented in the decision to transmit or delay. For example, if two thresholds are considered, a high threshold beyond which the network conditions are considered good or very good and a single bottom below which the conditions are considered bad or very bad can be defined. By providing several thresholds, it is possible to nuance the adjustment of the level of robustness of the transmission.

The quality indicator of the network conditions can vary depending on the type of network used. For a 2G cellular network, the Received Signal Strength Indicator or RSSI will be used. For a 4G, LTE Cat-NB or LTE Cat-M network, it is possible to use the Reference Signal Received Power (RSRP), or the Reference Signal Received Quality (RSRQ), representative of the signal/noise ratio. The server can also perform a PING', consisting in triggering the sending of a frame by the client, which allows the server to perform a more precise measurement. The person skilled in the art may choose other indicators, in particular for other types of network.

According to one or more exemplary embodiments, the quality threshold(s) are fixed relative to a reference value. This reference value can be chosen to be representative of a quality level that the server can expect, which allows the server to locate the current transmission conditions on a scale of the quality of the transmission conditions.

According to one or more exemplary embodiments, the reference value is pre-programmed in the server.

For example, the reference value is an RSSI or RSRP or RSRQ value pre-programmed based on known data characterizing the network implementation. The quality threshold(s) can be defined as percentages of these reference values. According to one or more exemplary embodiments, different reference values are integrated into a server, each reference value corresponding to a given indicator.

According to one or more exemplary embodiments, the reference value is determined by learning based on measurements carried out beforehand.

For example, the server performs reception quality indicator measurements in a periodic manner over a data collection period (e.g., every minute over a day). The quality thresholds are then determined on the basis of these historical data.

By way of illustrative example, a high threshold can be defined such that 25% of the measurements are greater than or equal to this high threshold, and a low threshold can be defined such that 25% of the measurements are less than or equal to this low threshold. This amounts to processing the data using percentiles.

Thus, the threshold(s) are a function of the actual environment of the server and may, according to the implementations, be updated if necessary or periodically, for example at each collection period. Each server thus has thresholds specific thereto.

According to one or more embodiments, the server has a pre-programmed reference value, used until a reference value determined by learning based on historical data can be used instead.

According to one or more embodiments, the server must transmit data within a time interval of a determined duration. Following each evaluation of the transmission conditions, the time remaining in the transmission interval to carry out a transmission is evaluated. The closer the end of this interval is, the more the server will, according to the exemplary embodiments, be (a) reducing its requirement regarding the quality of the transmission conditions, or (b) carrying out a transmission in a comparatively more robust mode, or combining (a) and (b).

It should be noted that at least one transmission test will be carried out before the end of the time interval. According to one or more exemplary embodiments, if no test carried out during the interval gives rise to a successful transmission, the method is repeated at another time of the period.

According to one or more exemplary embodiments, reducing the requirement for transmission conditions may for example consist in introducing a lower quality threshold than the initial threshold. According to other embodiments, several thresholds each of which is lower than the previous one are implemented, such as for example the high threshold and the low threshold mentioned above.

According to one or more exemplary embodiments, the robustness of the transmission is increased by increasing the number of frames for transmitting a certain amount of data. The frames are thus shorter and less exposed to the consequences of more difficult transmission conditions. According to certain embodiments, several levels of robustness are provided, with a number of frames increasing with the robustness level. According to certain embodiments, the robustness of the transmission is increased by reducing the quantity of the data to be transmitted, which also limits the size of the frame. For example, only some of the data is sent, the remainder not being transmitted. Alternatively, the data are processed so as to take less space, even though it reduces the accuracy thereof, for example by averaging several values to be transmitted.

Figure 2:
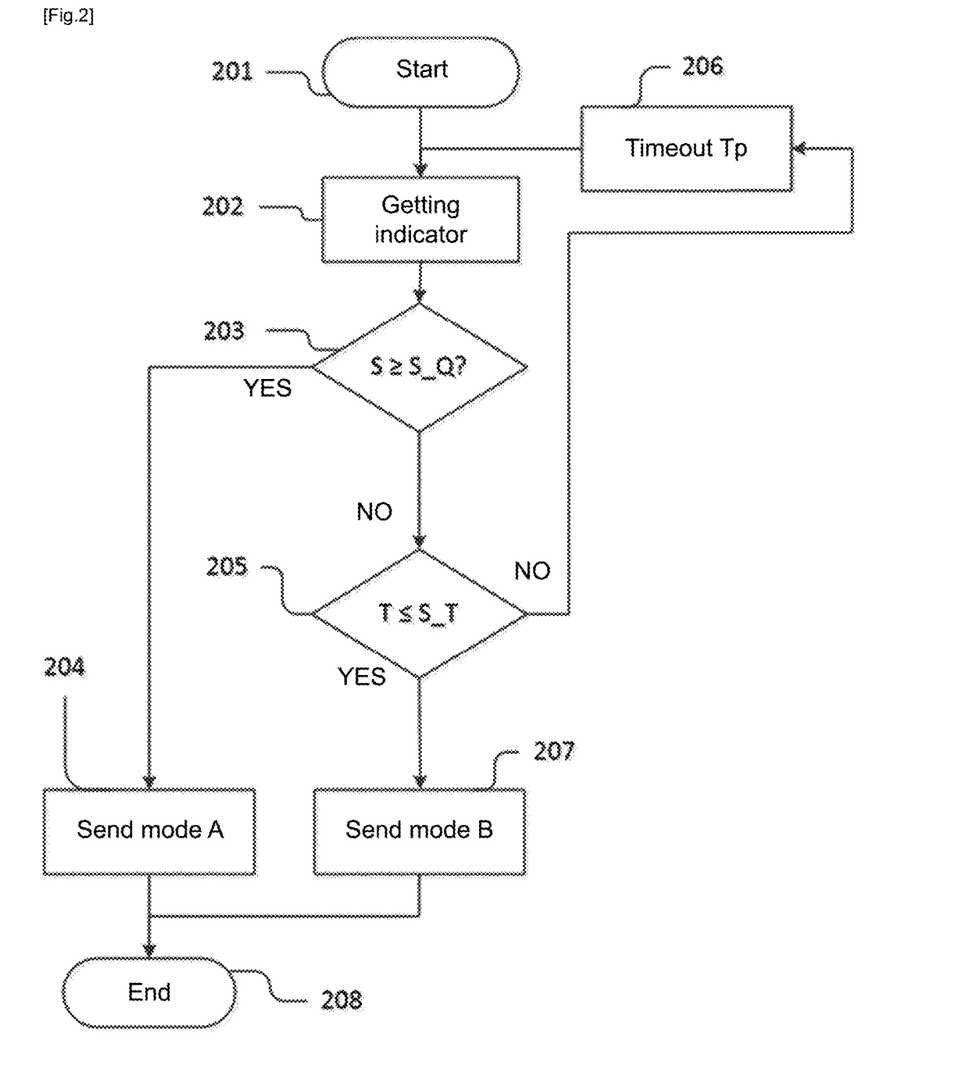
FIG. 2 is a flowchart of a push data method according to one or more exemplary embodiments.

FIG. 2 is a flowchart of a detailed method according to a first exemplary embodiment, implementing a single quality threshold.

Defined is:
A quality threshold S_Q of the indicator above which the network conditions are judged good.
A transmission interval of duration SLA.

The method shown in FIG. 2 begins in 201. The data to be transmitted are for example data collected by the server during a given time interval, for example one day. By way of illustration, the transmission interval assigned to the server may for example be a duration of a few hours daily.

A quality indicator value S is obtained at 202. This value is representative of the current quality of the transmission conditions between the server and the client. The indicator value is used in the decision-making process regarding transmission or not at a given time. A test is carried out (203) to determine whether the quality threshold S_Q is reached or exceeded. If so, the transmission of a frame in push mode is carried out (204). This transmission is done according to a first mode (mode A), which is the default transmission mode, that is to say with no particular measures to improve the robustness of the transmission, measures that would be taken to the detriment of the bandwidth, for example. According to one embodiment, this first mode consists, for example, in not limiting the quantity of useful data transmitted in the frame, relative to a maximum limit authorized by the applicable communication protocol. If the threshold is not reached, the server checks the remaining time T in the transmission interval. If this time T is less than a time threshold S_T, then a second transmission mode (mode B) is implemented at 207 to send the data. The second mode is more robust than the first mode, the goal being to improve the probability that the data will be correctly received by the client, in order to limit the number of frames to be returned. For example, the useful data to be transmitted are distributed over several frames, the individual length of which is shorter than one frame of the first mode. In a particular experimental context associated with DLMS, it has for example been found that using three frames gave good results. Thus, when there is a certain remaining time T, it is decided that it is no longer possible to wait for an improvement in the network conditions and a transmission is initiated in a more robust transmission mode.

If the remaining time T is greater than the time threshold S_T, it is assumed that the server can wait for better transmission conditions. This waiting is shown by the timeout Tp (206). The method then loops back to a new indicator measurement. The duration of the timeout depends on the context. It is chosen for example to be quite long to allow the transmission conditions to change. It represents a fraction of the duration SLA of the transmission interval. In the case of a cellular network, purely for the purpose of illustration it is about ten minutes, for example, for a duration of the transmission interval of two hours.

According to a first alternative embodiment of the first example, the timeout is fixed. According to a second alternative, the timeout is variable.

The time threshold can be determined in different ways. It can be fixed or variable. According to one embodiment, it is taken as a fraction of the duration SLA of the transmission interval, for example 25% of this duration. The person skilled in the art will be able to choose a time threshold based on a specific context.

The transmission ends at 208, after transmitting according to the first or second mode.

In the context of DLMS, in the event of successful reception of a frame transmitted by the server, the client produces an appropriate acknowledgment intended for the server. The server then knows that the transmission has been carried out correctly. If no response is received within the certain time period or an error message is received from the client, the server concludes that the transmission has not been properly carried out and performs a new test based on the method described. A maximum number of tests can be established.

Table 1 summarizes the method of FIG. 2.

TABLE 1

| Measured Indicator S | S ≥ Quality Threshold (S_Q) | S < Quality Threshold (S_Q) |
|---|---|---|
| T ≥ S_T | Send frame | Timeout before the indicator is measured |
| T < S_T | Send frame | Send in three frames |

Figure 3:
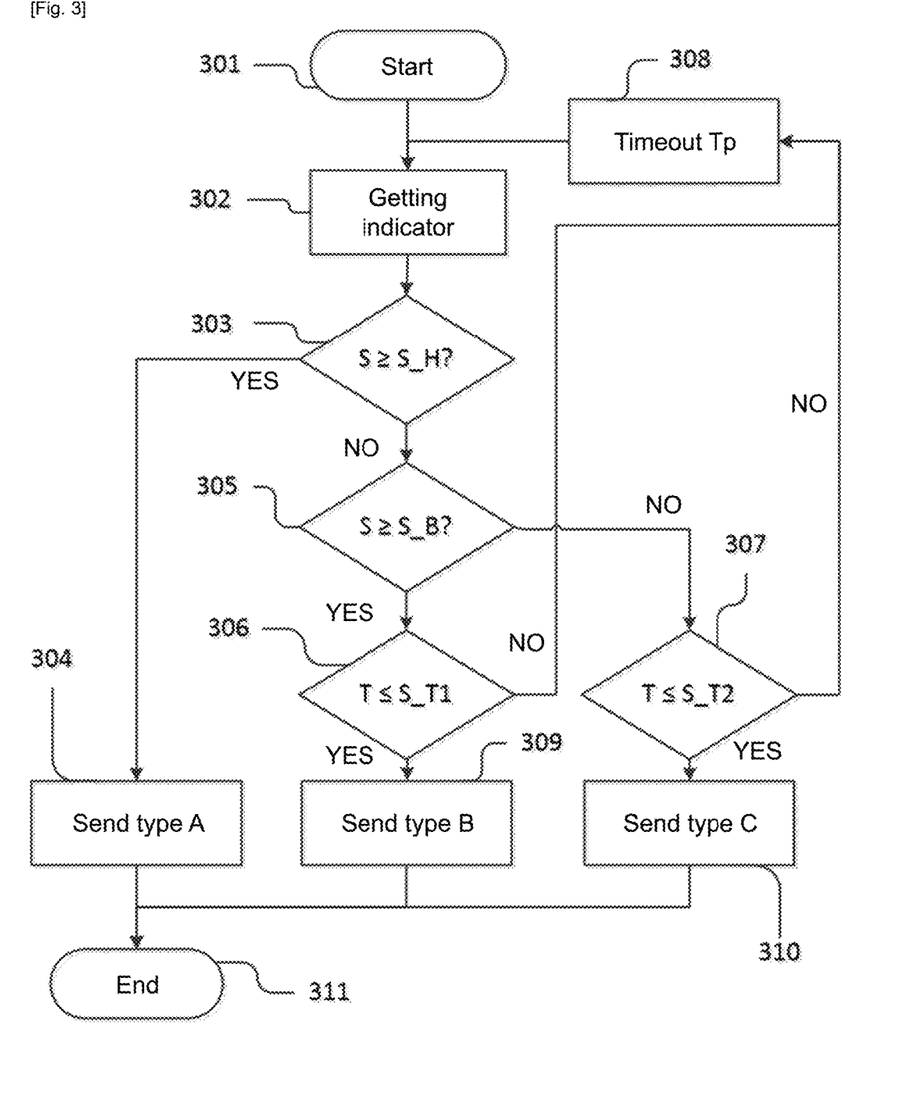
FIG. 3 is a flowchart of a push data method according to one or more exemplary embodiments.

FIG. 3 is a flowchart of a detailed method according to a second exemplary embodiment, implementing two quality thresholds. In the following, the differences with the first embodiment are mainly highlighted. A high-quality threshold S_H and a single low-quality S_B of the indicator are defined.

The method shown in FIG. 3 begins in 301. A value S of the quality indicator is obtained in 302. A test is carried out at 303 to determine whether the value of the indicator reaches or exceeds the high threshold S_H. If so, the transmission of a frame in push mode is carried out (304). This transmission is done according to the first mode (mode A), which is the default transmission mode, such as for the example shown in FIG. 2.

If the high threshold S_H is not reached, the server checks whether the indicator is greater than or equal to the low threshold, that is to say in the intermediate zone between the high threshold and the low threshold (at 305). If so, the remaining time T in the transmission interval is verified (at 306) to determine if better transmission conditions can be expected, in which case a timeout Tp is initiated at 308 before a new evaluation of the indicator. To verify if enough time remains, the time T is for example compared to a first time threshold, S_T1. By way of illustration, this time S_T1 is set at 50% of the duration of the transmission interval. If it is judged that there is not enough time remaining to wait for better conditions, a transmission according to a third mode (mode C) is carried out at 309.

Depending on the implementation selected, the third mode is either considered as identical to the first mode (mode A, without additional precautions regarding the robustness) or identical to the second mode (mode B, with increased robustness) already mentioned.

However, if the indicator is below the low threshold S_B (negative test at 305), then the remaining time T is compared at 307 to a second time threshold, S_T2. This second time threshold S_T2 is considered as less than the first time threshold S_T1. If the remaining time T is less than the second threshold, a transmission according to the second mode (mode B) is carried out at 310. If however, more time remains, the timeout Tp at 308 is restarted before a new indicator measurement. By way of illustration, S_T2 is considered for example as equal to 25% of the duration of the transmission interval. The method ends at 311 after a transmission according to the modes mentioned.

Table 2 summarizes the method of FIG. 3 in the case where mode B is identical to mode A.

TABLE 2

| Measured Indicator S | S ≥ High Threshold (S_H) | Low Threshold (S_B) ≤ S < High Threshold (S_H) | S < Low Threshold (S_B) |
|---|---|---|---|
| T ≥ S_T1 | Send frame | Timeout before the indicator is measured | Timeout before the indicator is measured |
| S_T2 ≤ T < S_T1 | Send frame | Send frame | Timeout before the indicator is measured |

TABLE 2-continued

| Measured Indicator S | S ≥ High Threshold (S_H) | Low Threshold (S_B) ≤ S < High Threshold (S_H) | S < Low Threshold (S_B) |
|---|---|---|---|
| T < S_T2 | Send frame | Send frame | Send in three frames |

According to other embodiments, intermediate thresholds of additional quality are introduced between the high- and low-quality thresholds, as well as respective intermediate time thresholds. The number of frames used for transmission will depend on the position of the measured value S of the quality indicator relative to the various quality thresholds. The greater the range between two thresholds in which the value indicated is of low quality, the more the number of frames will be increased and the more the robustness of the transmission will be increased.

According to an alternative embodiment applicable to all of the exemplary embodiments, the time thresholds, the quality thresholds and/or the duration of the timeout are configurable.

In the foregoing, various advantages have been described. A specific embodiment may have only one or more of said advantages, but not necessarily all the advantages. Certain embodiments may have one or more advantages that are not described and/or do not have any of the advantages described.

REFERENCE SIGNS

100—Server device
101—Processor
102—Memory
103—Meter
104—Communication bus
105—User interface
106—Bidirectional communication interface
107—Display
108—Software code
109—Working memory
110—Client device

The invention claimed is:

1. A method for data transmission in push mode to a receiver device, implemented by a transmitter device in a communication network, the transmitter device comprising a memory comprising software code and a processor which, when executing the software code, causes the transmitter device to implement the method, the method comprising:
   a) obtaining a value of an indicator representative of the quality of the transmission conditions between the transmitter device and the receiver device in the communication network;
   b) responsive to the value indicating a quality of the transmission conditions greater than a first quality threshold, transmitting a frame comprising the data to be transmitted to the receiver device;
   c) responsive to the value indicating a quality of the transmission conditions not being greater than the first quality threshold and a remaining time duration for performing the data transmission being less than a time threshold, transmitting the data to the receiver device; and
   d) responsive to the remaining time duration being greater than the time threshold implementing a timeout before repeating steps a to c.

2. The method according to claim 1, wherein the quality indicator is a signal level received from the receiver device.

3. The method according to claim 1, wherein the time threshold is a function of the value of the quality indicator, the time threshold increasing with increasing quality.

4. The method according to claim 1, wherein a transmission following the determination that the remaining time duration for carrying out the data transmission is less than a time threshold is carried out according to a transmission mode whose robustness depends on the value of the indicator, the robustness level being increased when the quality of the transmission conditions drops.

5. The method according to claim 4, comprising distributing the data to be transmitted over a number of frames that increases with the robustness level.

6. The method according to claim 1, wherein the duration of the timeout is fixed and chosen sufficiently long to allow for possible change in the transmission conditions.

7. The method according to claim 1, comprising, prior to the implementation of steps a to d, determining the quality threshold as a function of values of the quality indicator obtained by the transmitter device in the past.

8. A non-transitory tangible storage medium readable by a device provided with a processor, said medium comprising instructions which, when the program is executed by a processor of a device, cause the device to implement the method according to claim 1.

9. A transmitter device comprising a communication interface, a memory comprising software code and a processor, the transmitter device being configured for data transmission in push mode to a receiver device, the transmitter device being further configured to:
   a) obtain a value of an indicator representative of the quality of the transmission conditions between the transmitter device and the receiver device in the communication network;
   b) responsive to the value indicating a quality of the transmission conditions greater than a first quality threshold, transmit a frame comprising the data to be transmitted to the receiver device;
   c) responsive to the value indicating a quality of the transmission conditions not being greater than the first quality threshold and a remaining time duration for performing the data transmission being less than a time threshold, transmit the data to the receiver device; and
   d) responsive to the remaining time duration being greater than the time threshold, implementing a timeout before repeating a to c.

10. The transmitter device of claim 9, wherein the quality indicator is a signal level received from the receiver device.

11. The transmitter device of claim 9, wherein the time threshold is a function of the value of the quality indicator, the time threshold increasing with increasing quality.

12. The transmitter device of claim 9, further configured to carry out a transmission following the determination that the remaining time duration for carrying out the data transmission is less than a time threshold according to a transmission mode whose robustness depends on the value of the indicator, the robustness level being increased when the quality of the transmission conditions drops.

13. The transmitter device of claim 12, further configured to distribute the data to be transmitted over a number of frames that increases with the robustness level.

14. The transmitter device of claim 9, wherein the duration of the timeout is fixed and chosen sufficiently long to allow for possible change in the transmission conditions.

15. The transmitter device of claim 9, further configured to, prior to the implementation of a to d, determine the quality threshold as a function of values of the quality indicator obtained by the transmitter device in the past.

* * * * *